United States Patent
Lubnin

(10) Patent No.: US 7,598,315 B2
(45) Date of Patent: Oct. 6, 2009

(54) AQUEOUS DISPERSIONS OF NANOPARTICLE/POLYURETHANE COMPOSITES

(75) Inventor: Alexander V. Lubnin, Copley, OH (US)

(73) Assignee: Lubrizol Advanced Materials, Inc., Cleveland, OH (US)

(*) Notice: Subject to any disclaimer, the term of this patent is extended or adjusted under 35 U.S.C. 154(b) by 0 days.

(21) Appl. No.: 11/813,686

(22) PCT Filed: Jan. 24, 2006

(86) PCT No.: PCT/US2006/002603
§ 371 (c)(1), (2), (4) Date: Jul. 11, 2007

(87) PCT Pub. No.: WO2006/079098
PCT Pub. Date: Jul. 27, 2006

(65) Prior Publication Data
US 2008/0188605 A1    Aug. 7, 2008

Related U.S. Application Data

(60) Provisional application No. 60/646,363, filed on Jan. 24, 2005.

(51) Int. Cl.
- C08L 75/04 (2006.01)
- C08K 3/22 (2006.01)
- C08G 18/08 (2006.01)
- C08G 18/12 (2006.01)
- C08G 18/66 (2006.01)

(52) U.S. Cl. .......... 524/589; 524/591; 524/492; 524/493; 524/430; 524/432; 524/445; 977/773

(58) Field of Classification Search .......... 524/589, 524/591, 492, 430, 432, 445, 493; 977/773
See application file for complete search history.

(56) References Cited

U.S. PATENT DOCUMENTS

| | | | |
|---|---|---|---|
| 5,859,118 A | 1/1999 | Roesler et al. | |
| 6,916,878 B2 * | 7/2005 | Bremser et al. | 524/847 |
| 7,240,371 B2 * | 7/2007 | Liu et al. | 2/69 |
| 2002/0058739 A1 * | 5/2002 | Lorah et al. | 524/445 |
| 2003/0158322 A1 | 8/2003 | Rische et al. | |
| 2005/0004306 A1 | 1/2005 | Lubnin et al. | |
| 2005/0131109 A1 * | 6/2005 | Arndt et al. | 523/334 |
| 2005/0239939 A1 * | 10/2005 | Zheng et al. | 524/432 |
| 2005/0288431 A1 * | 12/2005 | Gindin et al. | 524/589 |
| 2006/0178443 A1 * | 8/2006 | Boinowitz et al. | 521/99 |
| 2007/0072991 A1 * | 3/2007 | Jana et al. | 524/589 |
| 2007/0135588 A1 * | 6/2007 | Diakoumakos et al. | 525/459 |
| 2007/0197709 A1 * | 8/2007 | Kim et al. | 524/445 |

FOREIGN PATENT DOCUMENTS

| | | |
|---|---|---|
| CN | 1303885 A | 7/2001 |
| RU | 2039767 C1 | 7/1995 |

* cited by examiner

*Primary Examiner*—Mark Eashoo
*Assistant Examiner*—Noah Frank
(74) *Attorney, Agent, or Firm*—Samuel B. Laferty; Joe A. Powell; Thoburn T. Dunlap

(57) ABSTRACT

An aqueous dispersion of nanoparticle/polyurethane composites is made by forming a mixture of nanoparticles and a continuous mass of a polyurethane prepolymer in the substantial absence of water and dispersing the mixture so made in aqueous medium. Alternatively, a polyurethane prepolymer or a mixture of nanoparticles and a continuous mass of a polyurethane prepolymer is dispersed into an aqueous dispersion of nanoparticles.

16 Claims, 1 Drawing Sheet

AQUEOUS DISPERSIONS OF NANOPARTICLE/POLYURETHANE COMPOSITES

CROSS REFERENCE

This application claims priority from PCT Application Ser. No. PCT/US2006/002603 filed on Jan. 24, 2006, which claims the benefit of U.S. Provisional Application No. 60/646,363 filed on Jan. 24, 2005.

FIELD OF THE INVENTION

This invention relates to aqueous dispersions of a nanoparticle/polyurethane composites.

BACKGROUND OF THE INVENTION

There has been some suggestion of making "cold blended" aqueous dispersions of nanoparticles and polyurethanes, i.e., aqueous dispersions formed by mixing separately prepared aqueous dispersions of nanoparticles and aqueous dispersions of polyurethanes.

SUMMARY OF THE INVENTION

Here, aqueous dispersions of nanoparticle/polyurethane composites, i.e., composite particles containing both nanoparticles and at least one polyurethane, are described. They are made by (1) forming a mixture of a polyurethane prepolymer and nanoparticles in the substantial absence of water, and then (2) dispersing the mixture in aqueous medium. Optionally, (3) the prepolymer can be neutralized and/or chain extended.

In one embodiment, the dispersions are prepared by reacting in the substantial absence of water (1) at least one polyisocyanate; (2) at least one active hydrogen containing compound, and (3) optionally, at least one water-dispersibility enhancing compound to form an isocyanate terminated prepolymer. This prepolymer is optionally neutralized by reaction with at least one neutralizing agent, dispersed in aqueous medium, and optionally chain extended by reaction with at least one of water, inorganic or organic polyamine having an average of about 2 or more primary and/or secondary amine groups, or combinations thereof. Nanoparticles are introduced into the reaction mixture at any time during prepolymer formation or before the prepolymer is dispersed in water.

DETAILED DESCRIPTION OF THE INVENTION

Figure 1:
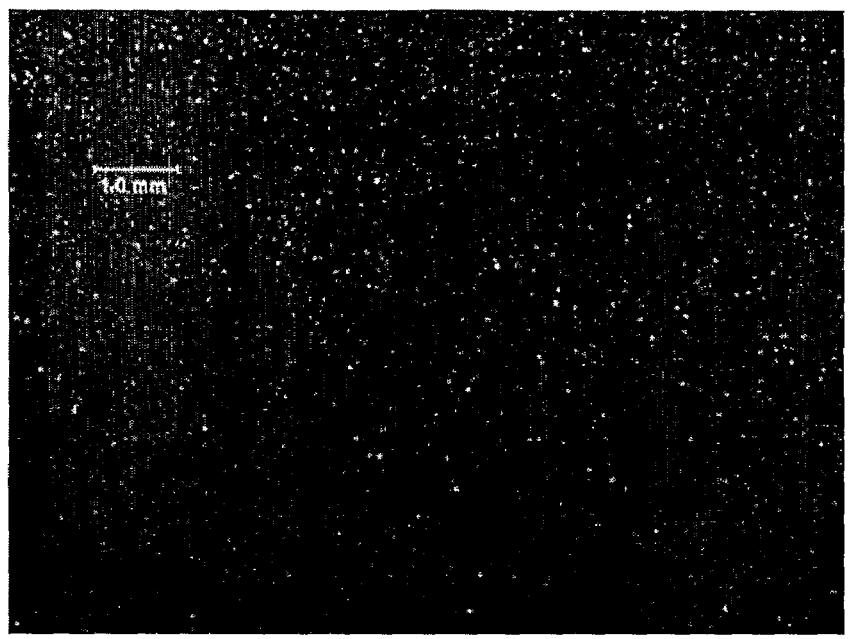
FIG. 1 is an optical microscopy photograph of a ~70-micron film made from dispersion from Example 5.
Figure 2:
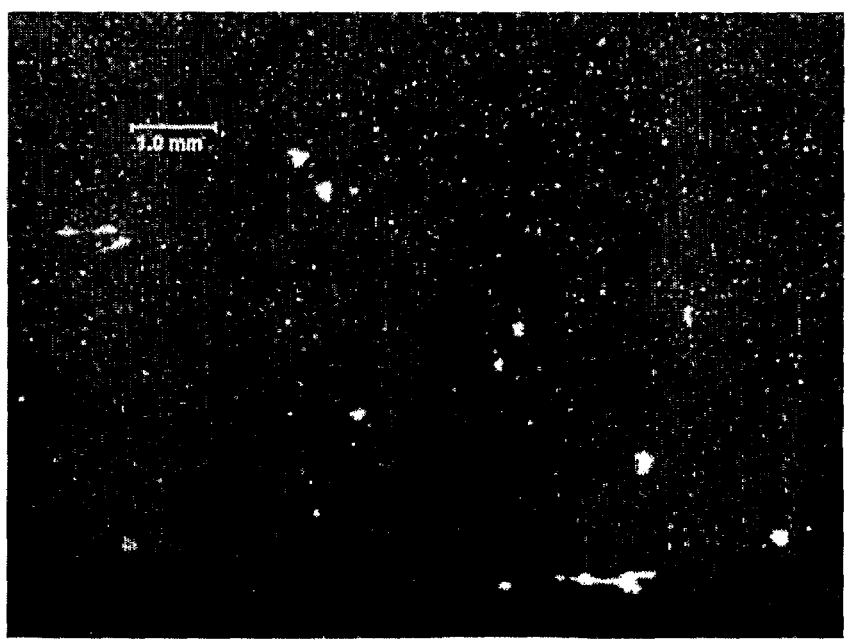
FIG. 2 is an optical microscopy photograph of a ~70-micron film made from dispersion from comparative Example 8.

In accordance with the invention, a blend of a polyurethane prepolymer and nanoparticles is prepared in the substantial absence of water and then dispersed in an aqueous medium to form a dispersion of composite particles composed of the polyurethane prepolymer and the nanoparticles.

Definitions

In this document, "polyurethane" is a generic term used to describe polymers including oligomers (e.g. prepolymers) which contain the urethane group, i.e., —O—C(=O)—NH—, regardless of how they are made. As well known, these polyurethanes can contain additional groups such as urea, allophanate, biuret, carbodiimide, oxazolidinyl, isocynaurate, uretdione, etc. in addition to urethane groups.

"Wt. %" means the number of parts by weight of monomer per 100 parts by weight of polymer, or the number of parts by weight of ingredient per 100 parts by weight of composition or material of which the ingredient forms a part.

"Aqueous medium" means a composition containing a substantial amount of water. It may contain other ingredients as well.

The "final polyurethane product" refers to the form of the polyurethane in the aqueous dispersion product of this invention. Where the polyurethane prepolymer is optionally chain extended, the final polyurethane product is this chain extended polymer. Where the polyurethane prepolymer is not chain extended, the final polyurethane product is the prepolymer itself.

"Substantial absence of water" refers to compositions formed without the intentional addition of any significant amount water, e.g., about 2 wt. % or so. A composition made by draining the water from an aqueous dispersion of silica and then adding the silica to organic ingredients would be formed in the substantial absence of water, even though a small amount of water might be present as a contaminant from the silica. A composition made by adding a highly concentrated silica dispersion to organic ingredient would not be formed in the substantial absence of water because the water from the dispersion. Also, "substantial absence of water" does not refer to water of crystallization.

"Substantial absence of surfactant" as well as "substantially free of residual surfactant" in reference to a dispersion means that the dispersion is made without intentionally including a surfactant for suspending or dispersing the dispersed phase of the dispersion.

Polyurethane Prepolymer Ingredients

The polyurethane prepolymers of this invention are formed from at least one polyisocyanate, at least one active hydrogen-containing compound and, optionally, at least one water-dispersibility enhancing compound.

(i) Polyisocyanate

Suitable polyisocyanates have an average of about two or more isocyanate groups, preferably an average of about two to about four isocyanate groups per molecule and include aliphatic, cycloaliphatic, araliphatic, and aromatic polyisocyanates, as well as products of their oligomerization, used alone or in mixtures of two or more. Diisocyanates are more preferred.

Specific examples of suitable aliphatic polyisocyanates include alpha, omega-alkylene diisocyanates having from 5 to 20 carbon atoms, such as hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, and the like. Polyisocyanates having fewer than 5 carbon atoms can be used but are less preferred because of their high volatility and toxicity. Preferred aliphatic polyisocyanates include hexamethylene-1,6-diisocyanate, 2,2,4-trimethyl-hexamethylenediisocyanate, and 2,4,4-trimethyl-hexamethylene diisocyanate.

Specific examples of suitable cycloaliphatic polyisocyanates include dicyclohexylmethane diisocyanate, (commercially available as Desmodur™ W from Bayer Corporation), isophorone diisocyanate, 1,4-cyclohexane diisocyanate, 1,3-bis-(isocyanatomethyl) cyclohexane, and the like. Preferred cycloaliphatic polyisocyanates include dicyclohexylmethane diisocyanate and isophorone diisocyanate.

Specific examples of suitable aralphatic polyisocyanates include m-tetramethyl xylylene diisocyanate, p-tetramethyl xylylene diisocyanate, 1,4-xylylene diisocyanate, 1,3-xylylene diisocyanate, and the like. A preferred aralphatic polyisocyanate is tetramethyl xylylene diisocyanate.

Examples of suitable aromatic polyisocyanates include 4,4'-diphenylmethylene diisocyanate, toluene diisocyanate, their isomers, naphthalene diisocyanate, and the like. A preferred aromatic polyisocyanate is toluene diisocyanate.

(ii) Active Hydrogen-containing Compounds

Any compound that provides a source of active hydrogen for reacting with isocyanate groups via the following reaction: —NCO+H—X —NH—C(=O)—X, can be used as the active hydrogen-containing compound in this invention. Examples include but are not limited to polyols, polythiols and polyamines.

"Polyol" in this context means any product having an average of about two or more hydroxyl groups per molecule. Examples include low molecular weight products called "extenders" with number average molecular weight less than about 500 Dalton such as aliphatic, cycloaliphatic and aromatic polyols, especially diols, having 2-20 carbon atoms, more typically 2-10 carbon atoms, as well as "macroglycols," i.e., polymeric polyols having molecular weights of at least 500 Daltons, more typically about 1,000-10,000 Daltons, or even 1,000-6,000 Daltons. Examples of such macroglycols include polyester polyols including alkyds, polyether polyols, polycarbonate polyols, polyhydroxy polyester amides, hydroxyl-containing polycaprolactones, hydroxyl-containing acrylic polymers, hydroxyl-containing epoxides, polyhydroxy polycarbonates, polyhydroxy polyacetals, polyhydroxy polythioethers, polysiloxane polyols, ethoxylated polysiloxane polyols, polybutadiene polyols and hydrogenated polybutadiene polyols, polyisobutylene polyols, polyacrylate polyols, halogenated polyesters and polyethers, and the like, and mixtures thereof. The polyester polyols, polyether polyols, polycarbonate polyols, polysiloxane polyols, and ethoxylated polysiloxane polyols are preferred.

The polyester polyols typically are esterification products prepared by the reaction of organic polycarboxylic acids or their anhydrides with a stoichiometric excess of a diol or diols. Examples of suitable polyols for use in the reaction include poly(glycol adipate)s, poly(ethylene terephthalate) polyols, polycaprolactone polyols, alkyd polyols, orthophthalic polyols, sulfonated and phosphonated polyols, and the like, and mixtures thereof.

The diols used in making the polyester polyols include alkylene glycols, e.g., ethylene glycol, 1,2- and 1,3-propylene glycols, 1,2-, 1,3-, 1,4-, and 2,3-butylene glycols, hexane diols, neopentyl glycol, 1,6-hexanediol, 1,8-octanediol, and other glycols such as bisphenol-A, cyclohexane diol, cyclohexane dimethanol (1,4-bis-hydroxymethylcycohexane), 2-methyl-1,3-propanediol, 2,2,4-trimethyl-1,3-pentanediol, diethylene glycol, triethylene glycol, tetraethylene glycol, polyethylene glycol, dipropylene glycol, polypropylene glycol, dibutylene glycol, polybutylene glycol, dimerate diol, hydroxylated bisphenols, polyether glycols, halogenated diols, and the like, and mixtures thereof. Preferred diols include ethylene glycol, diethylene glycol, butylene glycol, hexane diol, and neopentyl glycol.

Suitable carboxylic acids used in making the polyester polyols include dicarboxylic acids and tricarboxylic acids and anhydrides, e.g., maleic acid, maleic anhydride, succinic acid, glutaric acid, glutaric anhydride, adipic acid, suberic acid, pimelic acid, azelaic acid, sebacic acid, chlorendic acid, 1,2,4-butane-tricarboxylic acid, phthalic acid, the isomers of phthalic acid, phthalic anhydride, fumaric acid, dimeric fatty acids such as oleic acid, and the like, and mixtures thereof. Preferred polycarboxylic acids used in making the polyester polyols include aliphatic or aromatic dibasic acids.

Particularly interesting polyols are the polyester diols, i.e., any compound containing the —C(=O)—O— group. Examples include poly(butanediol adipate), caprolactones, acid-containing polyols, polyesters made from hexane diol, adipic acid and isophthalic acid such as hexane adipate isophthalate polyester, hexane diol neopentyl glycol adipic acid polyester diols, e.g., Piothane 67-3000 HNA (Panolam Industries) and Piothane 67-1000 HNA; as well as propylene glycol maleic anhydride adipic acid polyester diols, e.g., Piothane 50-1000 PMA; and hexane diol neopentyl glycol fumaric acid polyester diols, e.g., Piothane 67-500 HNF. Other preferred polyester diols include Rucoflex™. S1015-35, S1040-35, and S-1040-110 (Bayer Corporation).

The polyether polyols that can be used as the active hydrogen-containing compound in accordance with the present invention contain the —C—O—C— group. They can be obtained in a known manner by the reaction of (A) the starting compounds that contain reactive hydrogen atoms, such as water or the diols set forth for preparing the polyester polyols, and (B) alkylene oxides, such as ethylene oxide, propylene oxide, butylene oxide, styrene oxide, tetrahydrofuran, epichlorohydrin, and the like, and mixtures thereof. Preferred polyethers include poly(propylene glycol), polytetrahydrofuran, and copolymers of poly(ethylene glycol) and poly(propylene glycol).

Polycarbonate polyols include those containing the —O—C(=O)—O— group. They can be obtained, for example, from the reaction of (A) diols such 1,3-propanediol, 1,4-butanediol, 1,6-hexanediol, diethylene glycol, triethylene glycol, tetraethylene glycol, and the like, and mixtures thereof with (B) diarylcarbonates such as diphenylcarbonate or phosgene. Aliphatic and cycloaliphatic polycarbonate polyols can also be used.

Useful polyhydroxy polyacetals include the compounds that can be prepared from the reaction of (A) aldehydes, such as formaldehyde and the like, and (B) glycols such as diethylene glycol, triethylene glycol, ethoxylated 4,4'-dihydroxydiphenyldimethylmethane, 1,6-hexanediol, and the like. Polyacetals can also be prepared by the polymerization of cyclic acetals.

Instead of or in addition to a polyol, other compounds may also be used to prepare the prepolymer. Examples include polyamines, polyester amides and polyamides, such as the predominantly linear condensates obtained from reaction of (A) polybasic saturated and unsaturated carboxylic acids or their anhydrides, and (B) polyvalent saturated or unsaturated aminoalcohols, diamines, polyamines, and the like, and mixtures thereof Diamines and polyamines are among the preferred compounds useful in preparing the aforesaid polyester amides and polyamides. Suitable diamines and polyamines include 1,2-diaminoethane, 1,6-diaminohexane, 2-methyl-1,5-pentanediamine, 2,2,4-trimethyl-1,6-hexanediamine, 1,12-diaminododecane, 2-aminoethanol, 2-[(2-aminoethyl)amino]-ethanol, piperazine, 2,5-dimethylpiperazine, 1-amino-3-aminomethyl-3,5,5-trimethyl- cyclohexane (isophorone diamine or IPDA), bis-(4-aminocyclohexyl)-methane, bis-(4-amino-3-methyl-cyclohexyl)-methane, 1,4-diaminocyclohexane, 1,2-propylenediamine, hydrazine, urea, amino acid hydrazides, hydrazides of semicarbazidocarboxylic acids, bis-hydrazides and bis-semicarbazides, diethylene triamine, triethylene tetramine, tetraethylene pentamine, pentaethylene hexamine, N,N,N-tris-(2-aminoethyl)amine, N-(2-piperazinoethyl)-ethylene diamine, N,N'-bis-(2-aminoethyl)-piperazin-e, N,N,N'-tris-(2-aminoethyl) ethylene diamine, N-[N-(2-aminoethyl)-2-amino-ethyl]-N'-(2-aminoethyl)-piperazine, N-(2-aminoethyl)-N'-(2-piperazinoethyl-1)-ethylene diamine, N,N-bis-(2-aminoethyl)-N-(2-piperazinoethyl)amine, N,N-bis-(2-piperazinoethyl)-amine, polyethylene imines, iminobispropylamine, guanidine, melamine, N-(2-aminoethyl)-1,3-propane diamine, 3,3'-diaminobenzidine, 2,4,6-triaminopyrimidine, polyoxypropylene amines, trapropylenepentamine, tripropylenetetramine, N,N-bis-(6-aminohexyl)amine, N,N'-bis-(3-aminopropyl)ethylene diamine, and 2,4-bis-(4'-aminobenzyl)-aniline, and the like, and mixtures thereof. Preferred diamines and polyamines include 1-amino-3-aminomethyl-3,5,5-tri-methyl-cyclohexane (isophorone diamine or IPDA), bis-(4-aminocyclohexyl)-m-ethane, bis-(4-amino-3-methylcyclohexyl)-methane, ethylene diamine, diethylene triamine, triethylene tetramine, tetraethylene pentamine, and pentaethylene hexamine, and the like, and mixtures thereof. Other suitable diamines and polyamines include Jeffamine™. D-2000 and D-4000, which are amine-terminated polypropylene glycols, differing only by molecular weight, and which are available from Huntsman Chemical Company.

(iii) Water-Dispersibility Enhancing Compounds

Polyurethanes are generally hydrophobic and not water-dispersible. In accordance with one embodiment of the invention, therefore, at least one water-dispersibility enhancing compound (i.e. monomer), which has at least one, hydrophilic, ionic or potentially ionic group is optionally included in the polyurethane prepolymer to assist dispersion of the polyurethane prepolymer as well as the chain-extended polyurethane made therefrom in water, thereby enhancing the stability of the dispersions so made. Typically, this is done by incorporating a compound bearing at least one hydrophilic group or a group that can be made hydrophilic (e.g., by chemical modifications such as neutralization) into the polymer chain. These compounds may be of a nonionic, anionic, cationic or zwitterionic nature or the combination thereof. For example, anionic groups such as carboxylic acid groups can be incorporated into the prepolymer in an inactive form and subsequently activated by a salt-forming compound, such as a tertiary amine defined more fully hereinafter, in order to create a prepolymer having an acid number from about 1 to about 60, typically 1 to about 40, or even 10 to 35 or 12 to 30 or 14 to 25. Other water-dispersibility enhancing compounds can also be reacted into the prepolymer backbone through urethane linkages or urea linkages, including lateral or terminal hydrophilic ethylene oxide or ureido units.

Water dispersability enhancing compounds of particular interest are those which can incorporate carboxyl groups into the prepolymer. Normally, they are derived from hydroxy-carboxylic acids having the general formula $(HO)_x Q(COOH)_y$, wherein Q is a straight or branched hydrocarbon radical containing 1 to 12 carbon atoms, and x and y are 1 to 3. Examples of such hydroxy-carboxylic acids include dimethylolpropanoic acid (DMPA), dimethylol butanoic acid (DMBA), citric acid, tartaric acid, glycolic acid, lactic acid, malic acid, dihydroxymalic acid, dihydroxytartaric acid, and the like, and mixtures thereof. Dihydroxy-carboxylic acids are more preferred with dimethylolproanoic acid (DMPA) being most preferred.

Another group of water-dispersability enhancing compounds of particular interest are side chain hydrophilic monomers. Some examples include alkylene oxide polymers and copolymers in which the alkylene oxide groups have from 2-10 carbon atoms as shown, for example, in U.S. Pat. No. 6,897,281 the disclosure of which is incorporated herein by reference.

Other suitable water-dispersability enhancing compounds include thioglycolic acid, 2,6-dihydroxybenzoic acid, sulfoisophthalic acid, polyethylene glycol, and the like, and mixtures thereof.

(iv) Compounds Having at Least One Crosslinkable Functional Group

Compounds having at least one crosslinkable functional group can also be incorporated into the polyurethane prepolymers of the present invention, if desired. Examples of such compounds include those having carboxylic, carbonyl, amine, hydroxyl, epoxy, acetoacetoxy, olefinic and hydrazide groups, blocked isocyanates, and the like, and mixtures of such groups and the same groups in protected forms which can be reversed back into original groups from which they were derived.

Other suitable compounds providing crosslinkability include thioglycolic acid, 2,6-dihydroxybenzoic acid, and the like, and mixtures thereof.

(v) Catalysts

The prepolymer may be formed without the use of a catalyst if desired but may be preferred in some instances. Examples of suitable catalysts include stannous octoate, dibutyl tin dilaurate, and tertiary amine compounds such as triethylamine and bis-(dimethylaminoethyl) ether, morpholine compounds such as beta,beta-dimorpholinodiethyl ether, bismuth carboxylates, zinc bismuth carboxylates, iron (III) chloride, potassium octoate, potassium acetate, and DABCO® (diazabicyclo[2.2.2]octane), from Air Products. The preferred catalyst is a mixture of 2-ethylhexanoic acid and stannous octoate, e.g., FASCAT®.2003 from Elf Atochem North America.

(vi) Ingredient Proportions

Normally, the prepolymer produced in the present invention will be isocyanate-terminated. For this purpose, the ratio of isocyanate to active hydrogen in the prepolymer typically ranges from about 1.3/1 to about 2.5/1, preferably from about 1.5/1 to about 2.1/1, and more preferably from about 1.7/1 to about 2/1.

The typical amount of water-dispersibility enhancing compound in the prepolymer will be up to about 50 wt. %, more typically from about 2 wt. % to about 30 wt. %, and more especially from about 2 wt. % to about 10 wt. % based on the total weight of the prepolymer.

The amount of optional compounds having crosslinkable functional groups in the prepolymer will typically be up to about 1 milliequivalent, preferably from about 0.05 to about 0.5 milliequivalent, and more preferably from about 0.1 to about 0.3 milliequivalent per gram of final polyurethane on a dry weight basis.

The amount of catalyst used to form the prepolymer will typically be from about 5 to about 200 parts per million of the total weight of prepolymer reactants.

Nanoparticles

Any type of nanoparticles can be used in preparing the inventive dispersions. For example, metal oxides, metal salts, nanoelements such as nanometals, polymers, waxes, and so forth can be used. Specific examples include silica, alumina, ceria, copper oxide, iron oxide, nickel oxide, manganese oxide, zinc oxide, silicon carbide, silicon nitride, tin oxide, titania, tungsten oxide, yttria, zirconia, complex oxides such as zinc ferrite, magnesium ferrite, aluminum silicate and barium carbonate, various metal carbides such as titanium carbide, metal hydroxides such as aluminum hydroxide, magnesium hydroxide, manganese hydroxide and cerium hydroxide, naturally-occurring materials such as clays and talcs, as well as organic abrasives such as polystyrene, urea-formaldehyde and latex particles. Mixtures of these nanoparticles can also be used. Silica, alumina, clay, talc, titania, ceria and mixtures thereof are most often used.

Nanoparticles can also be formed in situ in the prepolymer and/or in dispersion from a precursor. For example, silica can be formed as a result of hydrolysis of tetraethoxysilane (TEOS). If the hydrolysis is to be induced in the prepolymer, sufficient amount of water needs to be added to accomplish full or partial conversion of TEOS into silica, it being understood that the mixture of nanoparticles and polyurethane prepolymer still needs to be formed in the substantial absence of water. Other examples of precursors include $Ti(OiPr)_4$, $Al(OiPr)_3$, and alike.

Yet another method of in situ nanoparticle generation is overbasing of organic fluids.

The particle size of the nanoparticles can vary widely, and essentially any particle size in the nanoparticle size range can be used. In general, the mean particle size of the particles, $D_{50}$ as determined by laser light scattering (e.g., by using a Malvern Mastersizer laser-based particle size measuring instrument), may be as large as 10 microns but will normally be less than 1 micron. Particles having a mean particle size of about 500 nm or less, more typically 250 nm or less, or even 100 nm or less are interesting. In other embodiments, the mean particle size will be 50 nm or less, 40 nm or less, 25 nm or less, or even 10 nm or less. In some embodiments, the particle size may even be as low as 5 nm or less, 2 nm or less, or even 1 nm or less.

Particle size can also be characterized by particle size distribution, since all particles in a batch of particles do not have an identical particle size. Thus, in some embodiments of the invention, it is desirable that the nanoparticle batch have a $D_{90}$ of less than 1 micron (i.e. 90% of the particles in the batch have diameters less than 1 micron). Nanoparticle batches with $D_{90}$'s of 600 nm or less, 500 nm or less, 200 nm or less, 100 nm or less, 50 nm or less, 40 nm or less, 10 nm or less and even 1 nm or less, are especially interesting.

Of particular interest are nanoparticle batches having $D_{90}$'s of about 100 nm or less, since nanoparticles of this size when exfoliated in a polymer matrix become translucent to transparent to the naked eye.

The concentration of nanoparticles in the prepolymer formed in accordance with the present invention can also vary widely, and essentially any amount can also be used. Typically, this means the prepolymer will contain about 0.01-70 wt. % nanoparticles, with 0.05-30 wt. % and even 0.1-10 wt. % being more typical.

Also, it should be appreciated that some chemical reaction between components of prepolymer and the surface of nanoparticles may occur such as, for example, the reaction of isocyanates with hydroxyl groups on nanoparticle surfaces.

Prepolymer Manufacture

Aqueous dispersions of nanoparticle/polyurethane composite particles are made in accordance with this invention by forming a blend of the nanoparticles and the polyurethane prepolymer in the substantial absence of water and then dispersing this blend in aqueous medium. This can be done in any fashion so long as a continuous mass of the prepolymer (as opposed to discrete particles of the prepolymer) is formed in the substantial absence of water and the nanoparticles combined with this prepolymer mass before the prepolymer is combined with water.

Typically, prepolymer formation will be done by bulk or solution polymerizing the ingredients of the prepolymer, with the nanoparticles being added to the system at any time. Thus, the nanoparticles can be combined with one of the ingredients forming the prepolymer, e.g. the polyisocyanate, the active hydrogen-containing compound or the water-dispersibility enhancing compound, before or after they are combined to form the prepolymer. Alternatively, the nanoparticles can be combined with the prepolymer at any time during prepolymer formation, i.e. at any time during the bulk or solution polymerization reaction. The nanoparticles can also be combined with the prepolymer after polymerization is substantially or even totally completed, if desired.

Bulk and solution polymerization are well known techniques and described, for example, in "Bulk Polymerization," Vol. 2, pp 500-514, and "Solution Polymerization," Vol. 15, pp 402-418, *Encyclopedia of Polymer Science and Engineering*, © 1989, John Wiley & Sons, New York. See, also, "Initiators," Vol. 13, pp. 355-373, Kirk-Othmer, *Encyclopedia of Chemical Technology*, © 1981, John Wiley & Sons, New York. The disclosures of these documents are also incorporated herein by reference.

Regardless of the particular procedure employed, the nanoparticles should be combined with the prepolymer and/or its reactants so that a blend or mixture, preferably an intimate admixture, of the prepolymer mass and the nanoparticles is formed before the mixture is dispersed in water.

Dispersion in an Aqueous Medium

Once the nanoparticle/polyurethane prepolymer blend is formed, it is dispersed in an aqueous medium to form a dispersion of the blend. Because the nanoparticles are combined with the prepolymer in the form of a continuous mass rather than discrete particles or droplets, the individual nanoparticle/prepolymer dispersed particles that are formed are composed of an intimate mixture of nanoparticles and the prepolymer. Separately dispersed nanoparticles are normally avoided. The result is that the aqueous dispersions obtained are substantially free, preferably essentially completely free, of separately dispersed nanoparticles, i.e., nanoparticles uncombined with polymer.

Dispersing the prepolymer/nanoparticle blend in aqueous medium can be done by any conventional technique, in the same way that other polyurethane prepolymers made by bulk or solution polymerization are dispersed in water. Normally, this will be done by combining the nanoparticle/prepolymer blend, with water with mixing. Where solvent polymerization is employed, the solvent and other volatile components can optionally be distilled off from the final dispersion, if desired.

In one embodiment of the invention, where the prepolymer includes enough water-dispersability enhancing compound to form a stable dispersion without added emulsifiers (surfactants), the dispersion can be made without such compounds, i.e., substantially free of surfactants, if desired. The advantage of this approach is that the coatings or other products made from the polyurethane exhibit less water sensitivity, better film formation, less foaming and reduced growth of mold, bacteria and so forth.

Prepolymer Neutralization

In those instances in which the prepolymer includes water-dispersibility enhancing compounds which produce pendant carboxyl groups, these carboxyl groups can be converted to carboxylate anions for enhancing the water-dispersibility of the prepolymer.

Suitable neutralizing agents for this purpose include tertiary amines, metal hydroxides, ammonium hydroxide, phosphines, and other agents well known to those skilled in the art. Tertiary amines and ammonium hydroxide are preferred, such as triethyl amine (TEA), dimethyl ethanolamine (DMEA), N-methyl morpholine, and the like, and mixtures thereof. It is recognized that primary or secondary amines may be used in place of tertiary amines, if they are sufficiently hindered to avoid interfering with the chain extension process.

Chain Extension

The aqueous nanoparticle/prepolymer composite particle dispersions produced as described above can be used as is, if desired. Alternatively, they can be chain extended to convert the prepolymers in the composite particles to more complex polyurethanes.

As a chain extender, at least one of water, inorganic or organic polyamine having an average of about 2 or more primary and/or secondary amine groups, polyalcohols, ureas, or combinations thereof is suitable for use in this invention. Suitable organic amines for use as a chain extender include diethylene triamine (DETA), ethylene diamine (EDA), meta-xylylenediamine (MXDA), aminoethyl ethanolamine (AEEA), 2-methyl pentane diamine, and the like, and mixtures thereof. Also suitable for practice in this invention are propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, sulfonated primary and/or secondary amines, and the like, and mixtures thereof. Suitable inorganic amines include hydrazine, substituted hydrazines, and hydrazine reaction products, and the like, and mixtures thereof. Suitable polyalcohols include those having from 2 to 12 carbon atoms, preferably from 2 to 8 carbon atoms, such as ethylene glycol, diethylene glycol, neopentyl glycol, butanediols, hexanediol, and the like, and mixtures thereof. Suitable ureas include urea and it derivatives, and the like, and mixtures thereof. Hydrazine is preferred and is most preferably used as a solution in water. The amount of chain extender typically ranges from about 0.5 to about 1.1 equivalents based on available isocyanate.

Additional Ingredients and Features

The polyurethane prepolymers, the product polyurethanes produced therefrom, and the aqueous nanoparticle/prepolymer composite particle aqueous dispersions of the present invention as described above can be made with various additional ingredients and features in accordance with known polyurethane technology. Examples include:

(i) Polymer Branching

Branching of the ultimate polymer product, as well as the prepolymer, can be accomplished for aiding tensile strength and improving resistance to creep—that is, recovery to that of or near its original length after stretching. In this regard, see U.S. Pat. No. 6,897,281, the disclosure of which has been incorporated herein by reference above.

(ii) Monofunctional Active Hydrogen-Containing Compounds

The prepolymers of this invention can also be made with monofunctional active hydrogen-containing compounds to enhance dispersibility of the prepolymer in aqueous medium and impart other useful properties, for example cross-linkability, as well as to adjust the morphology and rheology of the polymer when coated onto a substrate, as also described in the above-noted U.S. Pat. No. 6,897,281.

(iii) Plasticizers

The polyurethane prepolymers and ultimate polyurethane products of this invention can be prepared in the presence of a plasticizer. The plasticizer can be added at any time during prepolymer preparation or dispersion or to the polyurethane during or after its manufacture. Plasticizers well known to the art can be selected for use in this invention according to parameters such as compatibility with the particular polyurethane and desired properties of the final composition. See, for example, WO 02/08327 A1, as well as the above-noted U.S. Pat. No. 6,897,281.

(iv) Other Additives for Preparation of Dispersions

Other additives well known to those skilled in the art can be used to aid in preparation of the dispersions of this invention. Such additives include stabilizers, defoamers, antioxidants (e.g., Irganox 1010), UV absorbers, carbodiimides, activators, curing agents, stabilizers such as carbodiimide, colorants, pigments, neutralizing agents, thickeners, non-reactive and reactive plasticizers, coalescing agents such as di(propylene glycol) methyl ether (DPM), waxes, slip and release agents, antimicrobial agents, surfactants such as Pluronic™F68-LF and IGEPAL™CO630 and silicone surfactants, metals, coalescents, salts, flame retardant additives, antiozonants, and the like. They can optionally be added as appropriate before and/or during the processing of the dispersions of this invention into finished products as is well known to those skilled in the art. Additives may also be used as appropriate in order to make articles or to treat other products (such as by impregnation, saturation, spraying, coating, or the like). The dispersions of this invention typically have total solids of at least about 20 wt. %, preferably at least about 25 wt. % and more preferably at least about 30 wt. %.

(v) Blends with Other Polymers and Polymer Dispersions

The dispersions of this invention can be combined with commercial polymers and polymer dispersions by methods well known to those skilled in the art. Such polymers and dispersions include those described in WIPO Publication WO 02/02657 A2, U.S. Pat. Nos. 4,920,176, 4,292,420, 6,020, 438, 6,017,997 and a review article by D. P. Tate and T. W. Bethea, Encyclopedia of Polymer Science and Engineering, Vol. 2, p. 537, the disclosures of which are incorporated herein by reference.

Similarly, the dispersions of this invention can be formed by dispersing the nanoparticle/prepolymer mixture in a previously formed aqueous dispersion of another polymer or polymers and/or nanoparticles. In other words, the aqueous medium into which the nanoparticle/prepolymer mixture is dispersed in accordance with the present invention can itself be a previously formed aqueous dispersion of another polymer or polymers including those made by emulsion and suspension polymerization techniques and/or nanoparticles.

(vi) Hybrids with Other Polymers

The aqueous dispersions of this invention can also be used as seed polymers for forming hybrids of polyurethanes with other polymers. This can be done by forming the aqueous dispersions of nanoparticle/polyurethane composite in the manner described above, and then polymerizing additional monomers by emulsion or suspension polymerization in the presence of these dispersions, i.e., with the inventive dispersions being mixed with the additional monomers before polymerization is completed. Hybrids of polyurethanes and acrylics can be made to advantage by this approach.

Still another way of making hybrid polymers in accordance with the present invention is to include ethylenically unsaturated monomers in the polyurethane prepolymer reaction system and to cause these monomer to polymerize when or after the prepolymer is dispersed in aqueous medium. In this approach, the ethylenically unsaturated monomers act as a diluent during prepolymer formation. In the aqueous medium, these ethylenically unsaturated monomers can be polymerized to completion with or without additional monomers being added. Hybrids of polyurethanes and acrylics can be made to advantage by this approach, as well.

(vii) Water-Borne Energy Curable Nanoparticle/Polyurethane Compositions

It is already known that water-borne polyurethane and hybrid compositions that can be cured by application of energy (UV and IR radiation and/or electron beams) can be made by end-capping the polyurethane with (meth)acrylic esters and other ethylenically unsaturated monomers. This technology can be applied to this invention to provide energy-curable water-borne nanoparticle/polyurethane coatings.

Alternative Methods of Manufacture

Described above is a typical way the dispersions of the present invention can be made, i.e., by forming a nanoparticle/prepolymer blend in the substantial absence of water, and then dispersing the blend in an aqueous medium with mixing. Other known ways of making aqueous polyurethane dispersions can also be used to make the dispersions of this invention, provided that the nanoparticles and a continuous mass of the prepolymer are combined in the substantial absence of water before they dispersed in an aqueous medium. Examples are (i) Shear Mixing Dispersing the prepolymer by shear forces with emulsifiers (external emulsifiers, such as surfactants, or internal emulsifiers having nonionic, anionic, cationic and/or zwitterionic groups as part of or pendant to the polyurethane backbone, and/or as end groups on the polyurethane backbone).

(ii) Acetone Process

A prepolymer is formed with or without the presence of acetone, MEK, and/or other polar solvents that are non-reactive and easily distilled. The prepolymer is further diluted in said solvents as necessary, and chain extended with an active hydrogen-containing compound. Water is added to the chain-extended polyurethane, and the solvents are distilled off. A variation on this process would be to chain extend the prepolymer after its dispersion into water.

(iii) Melt Dispersion Process

An isocyanate-terminated prepolymer is formed, and then reacted with an excess of ammonia or urea to form a low molecular weight oligomer having terminal urea or biuret groups. This oligomer is dispersed in water and chain extended by methylolation of the biuret groups with formaldehyde.

(iv) Ketazine and Ketimine Processes

Hydrazines or diamines are reacted with ketones to form ketazines or ketimines. These are added to a prepolymer, and remain inert to the isocyanate. As the prepolymer is dispersed in water, the hydrazine or diamine is liberated, and chain extension takes place as the dispersion is taking place.

(v) Continuous Process Polymerization

An isocyanate-terminated prepolymer is formed. This prepolymer is pumped through high shear mixing head(s) and dispersed into water and then chain extended at said mixing head(s), or dispersed and chain extended simultaneously at said mixing head(s). This is accomplished by multiple streams consisting of prepolymer (or neutralized prepolymer), optional neutralizing agent, water, and optional chain extender and/or surfactant.

(vi) Reverse Feed Process

Water and optional neutralizing agent(s) and/or extender amine(s) are charged to the prepolymer under agitation. The prepolymer can be neutralized before water and/or diamine chain extender is added.

Applications

Nanoparticles can impart several useful properties to polymers including abrasion, mar and scratch resistance, barrier properties, flame retardance, chemical and stain resistance, higher tensile strength, catalytic, biocidal, magnetic and electric propertied, optical properties and effects, UV and radiation blocking, UV stability, self assembly, and so forth.

The aqueous nanoparticle/polyurethane composite particle dispersions of the present invention, both in prepolymer and chain extended form, can be used to make coatings and films for porous and non-porous substrates such as papers, non-woven materials, textiles, leather, wood, concrete, masonry, metals, house wrap and other building materials, fiberglass, polymeric articles, personal protective equipment (such as hazardous material protective apparel, including face masks, medical drapes and gowns, and firemen's turnout gear), and the like. Applications include papers and non-wovens; fibrous materials; films, sheets, composites, and other articles; inks and printing binders; flock and other adhesives; and personal care products such as skin care, hair care, and nail care products; livestock and seed applications; and the like.

Any fibrous material can be coated, impregnated or otherwise treated with the compositions of this invention by methods well known to those skilled in the art, including carpets as well as textiles used in clothing, upholstery, tents, awnings, and the like. Suitable textiles include fabrics, yarns, and blends, whether woven, non-woven, or knitted, and whether natural, synthetic, or regenerated. Examples of suitable textiles include cellulose acetate, acrylics, wool, cotton, jute, linen, polyesters, polyamides, regenerated cellulose (Rayon), and the like.

The compositions of this invention can be used as adhesives or to augment or supplement adhesive types well known to those skilled in the art. For example, particular adhesive properties can be achieved by varying type and amount of isocyanate(s); type, amount, and molecular weight of polyol(s); and amount of poly(alkylene oxide) side chain units.

In addition the principles of the present invention can be applied to other technologies for manufacturing aqueous polyurethane dispersions, provided that a polyurethane prepolymer is formed in the substantial absence of water in such technologies. For example, this invention can be applied to the technique for manufacturing plasticized polyurethane dispersions described in U.S. Pat. No. 6,576,702 by adding substantially water-free nanoparticles to the polyurethane prepolymers described in that patent before they are dispersed in aqueous medium. Similarly, this invention can be applied to the technique for manufacturing breathable polyurethane dispersions (i.e., dispersions which form layers of breathable polyurethanes) described in U.S. Pat. No. 6,897,281, as well as to the technique for manufacturing core-shell polyurethane dispersions described in U.S. Published Patent Application No. 20050004306, by adding substantially water-free nanoparticles to the polyurethane prepolymers described in those published applications before they are dispersed in aqueous medium. The disclosures of the above patent and published applications are incorporated herein by reference.

Alternate Approach

Another approach for making aqueous dispersions of nanoparticle/polyurethane prepolymer composite particles is to form a polyurethane prepolymer in the substantial absence of water and then disperse this prepolymer in an aqueous nanoparticle dispersion or previously made nanoparticle/polyurethane dispersion of the present invention, or a "cold blend" of nanoparticle dispersion and dispersion of any other polymer.

EXAMPLES

The following examples are presented to illustrate this invention:

Example 1

Prepolymer Step

A hydroxyl terminated polyester polyol having a molecular weight of 500 to 2000 was formed by reacting an alkane diol, an aliphatic dicarboxylic acid and an aromatic dicarboxylic acid polyol. This polyester polyol, a small amount of a trifunctional low molecular weight polyol, and an excess of 1,1'-methylenebis-(4-isocyanato cyclohexane) were reacted at 210-240° F. (99-116C) under a blanket of dry nitrogen for about 30 minutes. To about 440 grams of this system were added about 23 grams of dimethylolpropanoic acid (water dispersibility-enhancing compound), 50-150 grams of NMP (solvent/coalescing aid), and a small amount of tin catalyst and the reaction continued at 210-240° F. for an additional hour or so to produce an NCO-terminated prepolymer including dimethylolpropanoic acid reacted into the prepolymer chain. The system was cooled to between 135-150° F. (57-66° C.) and sufficient triethylamine was added to neutralize the carboxylic acid groups of the dimethylolpropanoic acid. The system was stirred for 5 minutes and then 58 grams of NanoTek® Aluminum Oxide (40 wt. % dispersion in NMP of aluminum oxide particles in the nanoparticle size range available from Nanophase Technologies) was added.

Dispersion and Extension Step

A portion (558 grams) of this composite prepolymer was charged with mixing into 595 g water at room temperature which contained a defoaming agent and about 60 grams of coalescing agent, over the course of about 15 minutes to form an aqueous dispersion of composite particles composed of nanoparticles and an NCO-terminated polyurethane prepolymer. An aqueous mixture of hydrazine and ethylene diamine was then added to chain extend the polyurethane prepolymer, thereby producing an aqueous dispersion of nanoparticle/polyurethane composite particles having a total solids content of 38.2%, a pH of 9.0, and a Brookfield Viscosity of 200 cP.

Example 2 (Comparative)

The procedure of example 1 was followed except no nanoparticles were added.

Examples 3-7

The procedure of example 2 was followed except for various amounts of NanoBYK 3600 were added to aqueous medium before dispersing the prepolymer. The results are summarized in Table 1.

TABLE 1

Results of Taber Abrasion test (ASTM D 4060-90).

| Example No. | $Al_2O_3$, % wt. | Weight loss, mg/1000 cycles |
|---|---|---|
| 2 (comparative) | 0 | 109 |
| 3 | 1 | 63 |
| 4 | 3 | 65 |
| 5 | 5 | 61 |
| 6 | 7.5 | 53 |
| 7 | 10 | 73 |

Example 8 (Comparative)

The procedure of example 5 was followed except NanoBYK 3600 was added to aqueous polymer dispersion from example 2.

Example 9

Prepolymer Step

Desmophen S-1015-120 (131 grams) and Desmodur W (144 grams) were reacted with mixing at 230-240° F. (110-116° C.) under a blanket of dry nitrogen for 30 minutes. Then 2.5 grams TMP were added. After 1 hr, the mixture was cooled to 200° F. (93° C.) and the following were added sequentially to the reactor: 16 grams DMPA, 77 grams NMP, and two drops of FASCAT® 2003 catalyst. After 1.5 hours at 200-210° F. (93-99° C.), the remaining isocyanate (NCO) was found to be 5.9% by titration with DBA and 1M HCl. The mixture was cooled to 160 F (71° C.) and the following were added into reactor: 52 grams NanoArc R1130PMA and 14 grams TEA. After 15 minutes mixing and cooling down to 130° F. (54° C.), the mixture was dispersed.

Dispersion and Extension Step

A portion (300 grams) of this composite prepolymer was charged with mixing into 350 grams water at room temperature over the course of about 10 minutes to form an aqueous dispersion of composite particles composed of nanoparticles and an NCO-terminated polyurethane prepolymer. After 20 minutes of mixing, an aqueous mixture of 5 grams 35% hydrazine, 2.5 grams ethylene diamine, and 2.5 grams water was added to chain extend the polyurethane prepolymer, thereby producing an aqueous dispersion of nanoparticle/polyurethane composite particles having a total solids content=42.6%, pH=7.5, particle size=105 nm, and a Brookfield Viscosity=320 cP.

Example 10

Prepolymer Step

The following materials were charged to a reactor: 240 grams polytetrahydrofuran ($M_n$=2,900), 110 grams Tegomer D-3403. Then with mixing, 137 grams Desmodur W were charged. The reactor was heated to 220-230° F. (104-110° C.) and after 30 minutes, two drops of FASCAT® 2003 catalyst were added. The mixture was stirred for 2 hours under a nitrogen blanket. Then 14 grams DMPA were added and reacted at 195-205° F. (91-96° C.) for 1 hour. The remaining isocyanate (NCO) was found to be 4.0% by titration with DBA and 1M HCl.

Dispersion and Extension Step

Prepolymer (375 grams) was charged over the course of about 10 minutes with mixing into a reactor containing 440 grams water and 88 grams Rhodigard W200. The mixture was stirred for 1 hr to form a uniform dispersion, and 8 grams of 35% hydrazine solution were added over approximately 10 minutes. Dispersion properties: total solids=43.6% wt., pH=6.0, particle size distribution intensity average 121 nm, Brookfield viscosity=820 cP.

Chemicals Used in Examples

DBA=dibutylamine
Desmodur W=1,1'-methylenebis-(4-isocyanato cyclohexane) from Bayer Corporation
Desmophen S-1015-120=hexane neopentyl adipate polyester polyol (number-average molecular weight $M_n$~1000 g/mol) from Bayer Corporation
DMPA=dimethylolpropanoic acid.
EDA=ethylene diamine
FASCAT® 2003=2-ethylhexanoic acid and stannous octoate
HCl=1M hydrochloric acid
Hydrazine solution=35 wt. % solution in water
NanoArc R1130PMA—30% wt. dispersion of nanoalumina in 2-methoxy-1-methylethyl acetate from Nanophase.
NanoBYK 3600—55% wt. dispersion of nanoalumina in water from BYK Chemie.
NanoTek® Aluminum Oxide—40 wt. % dispersion in NMP of $Al_2O_3$ particles from Nanophase Technologies.
NMP—1-methyl-2-pyrrolidone
Rhodigard W200—20% wt. nano-$CeO_2$ dispersion in water from Rhodia.
TEA=triethylamine;
Tegomer D-3403=trimethylolpropane monoethoxylate methyl ether ($M_n$=1,220 g/mol) from Degussa-Goldschmidt
Terathane 2900=polytetrahydrofuran ($M_n$=2,900 g/mol) from Invista
TMP=trimethylolpropane Test Methods 1. Brookfield Viscosity. Brookfield viscosity testing was performed using a Brookfield RV viscometer and spindles #3 to #6 (depending on viscosity) at 20 rpm and about 77° F.
2. Particle Size Measurements. The particle size and size distribution of the dispersions were obtained by Submicron Particle Sizer AutodilutePAT Model 370 (NICOMP Particle Sizing Systems) using an intensity average with Gaussian distribution.
3. Solids Content. Total solids were measured by Moisture/Solids Analyzer LabWare 9000™ (CEM Corporation).
4. pH Measurements. pH readings were taken using Acumet Basic pH Meter (Fisher Scientific).
5. Optical Microscopy. The samples were examined using incident (reflected) light on the Leica MZ16 stereomicroscope. The 1.25× objective was used.
6. NCO Titration. A sample of prepolymer (~3 grams) is weighted in a 250-ml Erlenmeyer flask. Toluene (50 ml) and 2M dibutylamine solution in toluene (20 ml) are added and the mixture is heated on a hot plate until the preplymer completely dissolves. The flask is filled up to 200 ml with isopropanol. Bromophenol blue indicator (6-7 drops) is added and solution is titrated with 1N HCl solution until the color changes from blue to light yellow.
7. Taber Abrasion. Abrasion resistance was measured by weight loss according to the ASTM method D 4060-90.

Although only a few embodiments of this invention have been described above, it should be appreciated that many modifications can be made without departing from the spirit and scope of the invention. All such modifications can be included within the scope of the invention, which is to be limited only by the following claims.

The invention claimed is:

1. A process for making an aqueous dispersion of nanoparticle/polyurethane composites, the process comprising:
   forming a mixture of nanoparticles and a continuous mass of a polyurethane prepolymer in the substantial absence of water, and
   dispersing the mixture in aqueous medium.
2. The process of claim 1, wherein the mixture of nanoparticles and a continuous mass of a polyurethane prepolymer is made by adding the nanoparticles to an ingredient forming the prepolymer before the prepolymer is made.
3. The process of claim 1, wherein the mixture of nanoparticles and a continuous mass of a polyurethane prepolymer is made by adding the nanoparticles to the reaction mass forming the prepolymer while the prepolymer is being made.
4. The process of claim 1, wherein the mixture of nanoparticles and a continuous mass of a polyurethane prepolymer is made by adding the nanoparticles to the prepolymer after it is made.
5. The process of claim 1, wherein the prepolymer is formed by bulk polymerization or solution polymerization.
6. The process of claim 1, further comprising chain extending the prepolymer.
7. The process of claim 6, wherein the prepolymer is chain extended in the aqueous medium.
8. The process of claim 1, wherein the polyurethane contains sufficient water dispersibility-enhancing compound so that the polyurethane will form a stable dispersion in the water in the substantial absence of surfactant.
9. The process of claim 8, wherein the water dispersibility-enhancing compound includes carboxyl groups, the process further comprising neutralizing the carboxyl groups.

10. The process of claim 9, wherein the dispersion formed by dispersing the mixture in aqueous medium is essentially free of residual surfactant.

11. The process of claim 1, comprising:
reacting in the substantial absence of water (1) at least one polyisocyanate; (2) at least one active hydrogen containing compound, and (3) optionally, at least one water-dispersibility enhancing compound to form an isocyanate terminated prepolymer, and then
optionally neutralizing the prepolymer with at least one neutralizing agent,
forming a mixture of nanoparticles and a continuous mass of an isocyanate terminated prepolymer in the substantial absence of water,
dispersing the prepolymer in aqueous medium, and then
optionally chain extending the prepolymer by reaction with at least one of water, inorganic or organic polyamine having an average of about 2 or more primary or secondary amine groups, or combinations thereof.

12. The process of claim 1, wherein the aqueous medium into which the nanoparticle/prepolymer mixture is dispersed is a previously formed aqueous dispersion of another polymer and/or nanoparticles.

13. The process of claim 1, wherein nanoparticle precursors are added to the prepolymer and then converted into nanoparticles in the prepolymer, in the dispersion or both.

14. The process of claim 1, wherein said nanoparticles have a mean particle size by light scatter intensity measurements of less than 250 nm.

15. The process of claim 1, wherein said nanoparticles comprise silica, alumina, ceria, zinc oxide, clay, or mixtures thereof.

16. The process of claim 1, wherein said nanoparticles are present from about 0.05 to about 30 weight percent based on the combined weight of said nanoparticles and said polyurethane prepolymer.

* * * * *